US012455424B2

(12) United States Patent
Compton et al.

(10) Patent No.: US 12,455,424 B2
(45) Date of Patent: Oct. 28, 2025

(54) FIBER OPTIC CABLE ASSEMBLY WITH HIGH PACKING DENSITY AND METHOD OF MAKING SAME

(71) Applicant: CORNING RESEARCH & DEVELOPMENT CORPORATION, Corning, NY (US)

(72) Inventors: Brandon Duvall Compton, Newton, NC (US); Christopher Shawn Houser, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 273 days.

(21) Appl. No.: 18/337,584

(22) Filed: Jun. 20, 2023

(65) Prior Publication Data

US 2024/0004153 A1    Jan. 4, 2024

Related U.S. Application Data

(60) Provisional application No. 63/428,817, filed on Nov. 30, 2022, provisional application No. 63/356,507, filed on Jun. 29, 2022.

(51) Int. Cl.
    *G02B 6/44*    (2006.01)
(52) U.S. Cl.
    CPC ......... *G02B 6/4431* (2023.05); *G02B 6/4476* (2013.01)
(58) Field of Classification Search
    None
    See application file for complete search history.

(56) References Cited

U.S. PATENT DOCUMENTS 7,461,981 B2 * 12/2008 Yow, Jr. ............. G02B 6/44775
                                                      385/76
8,548,294 B2 * 10/2013 Toge ................... G02B 6/4433
                                                      385/114
(Continued)

FOREIGN PATENT DOCUMENTS

WO    2022/115257 A1    6/2022

OTHER PUBLICATIONS

European Patent Application No. 23181683.6, Extended European Search Report dated Nov. 17, 2023, 7 pages, European Patent Office.

(Continued)

*Primary Examiner* — Jerry Rahll
(74) *Attorney, Agent, or Firm* — Adam R. Weeks

(57) ABSTRACT

A fiber optic cable assembly having a reduced cross-dimensional width includes a fiber optic cable carrying a plurality of optical fibers and having a furcation formed at an end thereof. The furcation includes a furcation housing and a plurality of furcation tubes extending from the furcation housing. Each of the plurality of furcation tubes is configured to receive a number of the plurality of optical fibers. The furcation further includes at least one connection interface terminating the optical fibers received in each of the plurality of furcation tubes. At least one of the furcation tubes has a diameter substantially equal to a theoretical minimum diameter corresponding to the number and size of the optical fibers received therein, and may be formed from a heat shrink material. A method of making such a fiber optic cable assembly is also disclosed.

20 Claims, 8 Drawing Sheets

(56) References Cited

U.S. PATENT DOCUMENTS

| | | | |
|---|---|---|---|
| 10,678,012 B1* | 6/2020 | Wu | G02B 6/562 |
| 10,718,917 B2* | 7/2020 | Fallahmohammadi | |
| | | | G02B 6/4404 |
| 2015/0234139 A1* | 8/2015 | Cignarale | G02B 6/441 |
| | | | 385/114 |
| 2019/0004273 A1* | 1/2019 | Faulkner | G02B 6/4476 |
| 2019/0049681 A1 | 2/2019 | Bookbinder et al. | |
| 2020/0103604 A1* | 4/2020 | Bradley | G02B 6/3861 |
| 2022/0026658 A1 | 1/2022 | Gajek | |
| 2022/0120988 A1 | 4/2022 | Houser et al. | |
| 2022/0163747 A1* | 5/2022 | Cooke | G02B 6/4479 |
| 2022/0206229 A1* | 6/2022 | Nakanishi | G02B 6/3885 |

OTHER PUBLICATIONS

"The best known packings of equal circles in a circle", Retrieved from: http://hydra.nat.uni-magdeburg.de/packing/cci/cci.html, 2023, 39 pages.

* cited by examiner

| # of Fibers | Size of Fibers (um) | | |
| --- | --- | --- | --- |
| | 150 | 200 | 250 |
| 12 | 0.6 | 0.81 | 1.01 |
| 24 | 0.85 | 1.13 | 1.41 |
| 48 | 1.17 | 1.56 | 1.95 |
| 72 | 1.42 | 1.89 | 2.37 |
| 96 | 1.63 | 2.18 | 2.72 |

FIG. 6

FIBER OPTIC CABLE ASSEMBLY WITH HIGH PACKING DENSITY AND METHOD OF MAKING SAME

PRIORITY APPLICATIONS

This application claims the benefit of priority of U.S. Provisional Application No. 63/428,817, filed on Nov. 30, 2022, and U.S. Provisional Application No. 63/356,507, filed on Jun. 29, 2022, the content of such applications being relied upon and incorporated herein by reference in entirety.

TECHNICAL FIELD

This disclosure relates generally to optical connectivity, and more particularly to high packing density fiber optic cable assemblies having optical fibers terminated with connection interfaces (e.g., ferrules) at a furcated end thereof, wherein the furcated end is arranged to minimize a cross-dimensional width of the cable assembly along the furcated end using minimally-sized furcation tubes. The disclosure also relates to a method of making fiber optic cable assemblies having a minimized cross-dimensional width along the furcated end.

BACKGROUND

The large amount of data and other information transmitted over the internet has led businesses and other organizations to develop large scale data centers for organizing, processing, storing and/or disseminating large amounts of data. Data centers contain a wide range of information technology (IT) equipment including, for example, servers, networking switches, routers, storage subsystems, etc. Data centers further include a large amount of cabling and racks to organize and interconnect the IT equipment in the data center. Modern data centers may include multi-building campuses having, for example, one primary or main building and a number of auxiliary buildings in close proximity to the main building. All the buildings on the campus are interconnected by a local fiber optic network.

More particularly, each of the auxiliary buildings are typically coupled to the main building by one or more high fiber-count optical cables referred to as trunk cables or interconnect cables. Each trunk cable may include, for example, 3,456 optical fibers, and even higher fiber-count trunk cables may be common in the future. To facilitate connections between the various buildings on the campus, conduits or other cable ducts configured to carry fiber optic cables are typically installed between the buildings when the data center is constructed. Moreover, to provide optical connectivity in the main building, for example, the optical fibers of a trunk cable are typically spliced to optical fibers of indoor cables (such as in a splice cabinet of the like) that route to the IT equipment in the main building. The indoor cables are similarly routed through interior conduits, ducts, raceways, etc. within the buildings during the construction of the data center. For convenience, the external and internal conduits, ducts, raceways, etc. will be referred to herein as "paths" or "pathways."

To meet the current and future demand for bandwidth, manufacturers and installers strive to provide the highest number of optical fibers possible in a small or given amount of space. The challenge here is how to increase the number of optical fibers when, in many cases, aspects of the physical infrastructure have already been established or determined (and realizing that rebuilding the physical infrastructure is a high-cost option). In other words, the challenge becomes how to increase the number of optical fibers in existing pathways having a fixed size. Indeed, the efficient utilization of space (i.e., more capacity in less space) has become a primary design driver for manufacturers and installers as the demand for bandwidth has increased.

This design driver has already manifested itself in fiber optic cable design. For example, fiber optic ribbons have been developed that provide a compact and high fiber count arrangement of optical fibers for fiber optic cables. There may be one ribbon per cable or many (e.g., hundreds) of ribbons per cable. Each ribbon includes a plurality of the optical fibers (e.g., eight or twelve optical fibers) arranged in a generally side-by-side manner (e.g., a linear array) and encapsulated within a thin and continuous matrix material. More recently, "rollable ribbons" have been developed that increase the pliability of conventional "flat" ribbons. Rollable ribbons are similar to flat ribbons but use a discontinuous or intermittent matrix material to hold adjacent optical fibers together. Rollable ribbon can lead to reduced weight, lower material costs, and even higher packing densities in fiber optic cables compared to traditional flat ribbon. Because of their compact, high fiber count design, the optical fibers in many current fiber optic cables are provided in the form of ribbons.

To route the internal and external fiber optic cables through the pathways during original installation or during an upgrade with new or additional fiber optic cables, one end of the cable is typically provided with a pull grip assembly (referred to as a "pull grip" or "pulling grip"). A tension member that extends through the pathway is then coupled to the pulling grip and the fiber optic cable is pulled through the pathway by the tension member. The pulling grip is typically slightly larger than the fiber optic cable to which it is attached and as such typically represents the maximum cross-dimensional width of the fiber optic cable being routed through the pathway. In this disclosure, "cross-dimensional width" refers to width in a cross-sectional plane that is transverse to a longitudinal axis along which the fiber optic cable extends. For unterminated fiber optic cables, a minimum cross-dimensional pulling grip may be achieved by minimizing the size of the fiber optic cable. As noted above, this may be achieved by using ribboned fiber optic cables. Once the fiber optic cable is routed along the desired pathway, the pulling grip may be removed and the end of the fiber optic cable may be terminated.

As is generally known in the industry, however, field splicing or field termination of fiber optic cables have several drawbacks, including lower reliability and a heavy dependence on the skill and ability of the technician(s) performing the termination. To avoid these drawbacks, there is a desire to pre-terminated fiber optic cables with optical connectors or connector components (e.g., ferrules) to form a fiber optic cable assembly. The pre-termination of fiber optic cables typically occurs in a manufacturing setting where precise and controllable processes (e.g., automated processes) may be used to terminate the optical fibers. As known in the fiber optic industry, an end of a fiber optic cable is typically pre-terminated via a furcation. A furcation includes a furcation housing and a plurality of furcation tubes configured to extend from one end of the furcation housing. The optical fibers of the cable extend through the furcation housing and one or more optical fibers extend through each of the furcation tubes. The optical fibers are subsequently terminated at the end of the furcation tubes by at least one connection interface (e.g., optical connector or connector component).

For example, the end of the fiber optic cable may be stripped of its outer jacket to expose the ribbons carried in the fiber optic cable. The furcation housing may then be placed over the exposed ribbons such that the ribbons extend through the housing. The furcation housing may also be attached to the outer jacket of the fiber optic cable at the stripped end such that tensile forces applied to the pulling grip (which in turn attaches to the furcation housing) are ultimately transferred to the fiber optic cable (e.g., the tensile strength members of the fiber optic cable). Next, one or more of the fiber optic ribbons may be inserted through each of the furcation tubes such that the ribbons extend beyond the end of the furcation tubes. The size of the furcation tubes is generally fixed and is typically oversized to easily allow the ribbons to be threaded through the length of the furcation tubes. An end of each of the furcation tubes is then inserted into a rear end of the furcation housing and the furcation housing is filled with an adhesive to secure the ribbons and the furcation tubes to the housing. The exposed ends of the ribbons are then connectorized to terminate the fiber optic cable and form a fiber optic cable assembly.

As noted above, a pulling grip for routing the pre-terminated fiber optic cable assembly through the pathway is disposed over the furcated end of the cable assembly and attached to the furcation housing. As can be appreciated, the connection interfaces may be relatively large and thereby increase the cross-dimensional width of the fiber optic cable assembly at the furcated end of the cable assembly. The pulling grip must now be sized to accommodate not only the fiber optic cable but also the connection interfaces that terminate the optical fibers. Thus, the pulling grip is generally larger than that used for unterminated fiber optic cables. Accordingly, installation of pre-terminated fiber optic cable assemblies may be a challenge for pathways where space is very restricted.

For example, if all of the optical fibers in the fiber optic cable assembly were terminated at the same location (e.g., each of the furcation legs of the furcation have the same length), then the cross-dimensional width of the fiber optic cable assembly (and thus the size of the pulling grip that goes over the end of the cable and encompasses the connection interfaces) will be generally large and likely constitute a maximum. To reduce the cross-dimensional width of the fiber optic cable assembly along the furcation, it is known to stagger the connection interfaces along the length of the furcation. In other words, the furcation legs have monotonically increasing lengths such that the at least one connection interface at the end of one furcation leg is longitudinally spaced from the at least one connection interface at the end of other furcation legs. Thus, in such a staggered configuration, a cross section at the end of a furcation leg (but for possibly the last furcation leg with the greatest length) includes at least one connection interface and one or more furcation tubes that extend past the at least one connection interface. Such furcation tubes that extend past a connection interface are referred to herein as "bypass furcation tubes."

With this staggered configuration, the greatest cross-dimensional width along the furcation occurs at the at least one connection interface at the end of one of the furcation legs. Assuming, for example, that each furcation tube of the furcation has the same number of connection interfaces (e.g., such as one connection interface at the end of each furcation tube), then the greatest cross-dimensional width of the furcation occurs at the end of the first furcation tube (i.e., the furcation tube with the shortest length) since the cross-dimensional width must accommodate not only the at least one connection interface but also the greatest number of bypass furcation tubes. Since the pulling grip is disposed over the furcation, the minimum size of the pulling grip is then determined by the cross-dimensional width of the fiber optic cable assembly at the at least one connection interface at the end of the first furcation tube.

While longitudinally staggering the connection interfaces at the end of the furcation tubes has significantly reduced the cross-dimensional width of the cable assembly along the furcation (and thus the pulling grip), the desire for increased fiber densities within fixed-size pathways drives manufacturers and installers to seek further reductions in cable assembly cross-dimensional widths along the furcation.

SUMMARY

In one aspect of the disclosure, a fiber optic cable assembly having a reduced cross-dimensional width along the furcation is disclosed. The fiber optic cable assembly includes a fiber optic cable having a first end and a second end and carrying a plurality of optical fibers. Each optical fiber of the plurality of optical fibers has a nominal outer diameter, also referred to as "size" in this disclosure. A furcation is formed at one or both of the first end and the second end of the fiber optic cable. The furcation includes a furcation housing connected to the fiber optic cable and configured to receive the plurality of optical fibers therein, and a plurality of furcation tubes extending from the furcation housing. Each of the plurality of furcation tubes is configured to receive a number (i.e., one or more) of the plurality of optical fibers therein. Furthermore, each of the plurality of furcation tubes defines at least in part a respective furcation leg of the furcation. The furcation further includes at least one connection interface terminating the number of the plurality of optical fibers received in each of the plurality of furcation tubes. At least one of the plurality of furcation tubes has a diameter substantially equal to a theoretical minimum diameter corresponding to the number and the nominal diameter of the optical fibers received in the at least one of the plurality of furcation tubes. In one embodiment, each of the plurality of furcation tubes has a diameter substantially equal to the theoretical minimum diameter corresponding to the number and the nominal diameter of the optical fibers received in the furcation tubes In one embodiment, the plurality of optical fibers includes a plurality of fiber optic ribbons and each of the plurality of furcation tubes receives one or more of the plurality of fiber optic ribbons. In an exemplary embodiment, the plurality of fiber optic ribbons may include a plurality of rollable fiber optic ribbons. In an alternative embodiment, the plurality of fiber optic ribbons may include a plurality of flat ribbons. Moreover, in one embodiment, the furcation may have a staggered configuration where each of the furcation legs has a different length. In this embodiment, each of the furcation tubes extending from the furcation housing may have a different length as well.

The fiber optic cable assembly has a maximum cross-dimensional width along its length. In one embodiment, the maximum cross-dimensional width of the fiber optic cable assembly occurs along the furcation. More particularly, in one embodiment, the maximum cross-dimensional width occurs at the at least one connection interface associated with one of the furcation legs. For example, the maximum cross-dimensional width of the fiber optic cable assembly may occur at the at least one connection interface associated with the shortest furcation leg.

In one embodiment, the at least one of the plurality of furcation tubes is transformable from an expanded configuration having an expanded diameter to a contracted configuration having a contracted diameter less than the expanded diameter. The one or more optical fibers may be inserted through the at least one transformable furcation tube when in the expanded configuration and thereafter transformed to the contracted configuration to provide a high packing density of optical fibers within the at least one transformable furcation tube. In one embodiment, for example, the at least one transformable furcation tube may be formed from a heat shrink material, which moves from the expanded configuration to the contracted configuration with the application of heat. In one embodiment, the heat shrink material may have a shrink ratio between about 20% and about 50%, and more particularly between about 25% and about 35%. In one embodiment, the contracted diameter of the at least one of the plurality of furcation tubes may be configured to be less than the theoretical minimum diameter, such as between about 3% and about 10%, and more particularly about 5% less than the theoretical minimum diameter.

In one embodiment, the fiber optic cable assembly may further include a pulling grip disposed over the furcation legs and connected to the fiber optic cable assembly, such as via the furcation housing. In one embodiment, the pulling grip may have a maximum inner diameter that is less than an outer diameter of the furcation housing. In one embodiment, relative sizes of the plurality of furcation tubes and the at least one connection interface are configured such that the maximum inner diameter of the pulling grip may be determined solely by the size of the at least one connection interface. In one particular embodiment, for example, the at least one connection interface has a footprint with a height h and a width w, and the inner diameter $D_i$ of the pulling grip may be related to the at least one connection interface by $D_i = \sqrt{h^2 + w^2}$.

In another aspect of the disclosure, the fiber optic cable assembly includes a fiber optic cable having a first end and a second end and carrying a plurality of optical fibers. A furcation is formed at one or both of the first end and the second end of the fiber optic cable. The furcation includes a furcation housing connected to the fiber optic cable and configured to receive the plurality of optical fibers therein, and a plurality of furcation tubes extending from the furcation housing. Each of the plurality of furcation tubes is configured to receive a number (i.e., one or more) of the plurality of optical fibers therein. Furthermore, each of the plurality of furcation tubes defines at least in part a respective furcation leg of the furcation. The furcation further includes at least one connection interface terminating the number of the plurality of optical fibers received in each of the plurality of furcation tubes. At least one of the plurality of furcation tubes is transformable from an expanded configuration having an expanded diameter to a contracted configuration having a contracted diameter less than the expanded diameter. By way of example, each of the plurality of transformable furcation tubes may be formed from a heat shrink material and move from the expanded configuration toward the contracted configuration with the application of heat.

In a further aspect of the disclosure, a method of making a fiber optic cable assembly from a fiber optic cable having a first end and a second end and carrying optical fibers is disclosed. The method includes forming a furcation at one or both of the first end and the second end of the fiber optic cable. The forming step includes exposing a working length of the optical fibers; locating a furcation housing over a portion of the working length of the optical fibers so that end sections of the optical fibers extend through the furcation housing; and providing a plurality of furcation tubes, wherein at least one of the plurality of furcation tubes is a transformable furcation tube configured to transform from an expanded configuration having an expanded diameter to a contracted configuration having a contracted diameter less than the expanded diameter. The method further includes, for each furcation tube of the plurality of furcation tubes, inserting a number (i.e., one or more) of the optical fibers through the furcation tube, and terminating the number of the optical fibers extending through each furcation tube of the plurality of furcation tubes with at least one connection interface. For each transformable furcation tube, the method further includes, after inserting the number of the optical fibers through the furcation tube, transforming the furcation tube from the expanded configuration toward the contracted configuration.

In one embodiment, the end sections of the optical fibers comprise fiber optic ribbons. In a further embodiment, each furcation tube of the plurality of furcation tubes defines at least in part a respective furcation leg, and forming the furcation further includes forming each furcation leg with a different length so that the furcation has a staggered configuration.

In one embodiment, each of the optical fibers has a nominal diameter; and for each transformable furcation tube, transforming the furcation tube from the expanded configuration toward the contracted configuration further includes transforming the furcation tube to have a diameter substantially equal to a theoretical minimum diameter corresponding to the number and the nominal diameter of the optical fibers received in the furcation tube. In one embodiment, each transformable furcation tube may be selected such that the contracted diameter is less than the theoretical minimum diameter, such as between about 3% and about 10%, and more particularly about 5% less than the theoretical minimum diameter. In one embodiment, each transformable furcation tube may be formed from a heat shrink material and transforming the furcation tube from the expanded configuration toward the contracted configuration may include heating the furcation tube. Each transformable furcation tube may be selected to have a heat shrink ratio between about 20% and about 50%, and more particularly between about 25% and about 35%.

In one embodiment, the method may further include disposing a pulling grip over the end sections of the optical fibers and attaching the pulling grip to the fiber optic cable assembly, such as to the furcation housing. In one embodiment, the pulling grip may be selected to have an inner diameter substantially equal to the maximum cross-dimensional width of the fiber optic cable assembly along the furcation. In one particular embodiment, for example, the at least one connection interface has a footprint with a height h and a width w and the inner diameter $D_i$ may be related to the at least one connection interface by $D_i = \sqrt{h^2 + w^2}$.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 6 is a table listing tube diameters (in millimeters) for some common sizes of optical fibers and quantities of optical fibers carried in fiber optic cables.

DETAILED DESCRIPTION

Various embodiments will be further clarified by examples in the description below. In general, the description relates to minimizing the cross-sectional width of a fiber optic cable assembly by minimizing the size of the furcation tubes used along the furcation that terminates the optical fibers of the fiber optic cable with one or more connection interfaces. The size of the furcation tubes may be reduced so as to be substantially equal to a theoretical minimum diameter of the furcation tubes for the number and size of optical fibers extending through the furcation tubes. Providing such small furcation tubes provides challenges during the manufacture of the furcation. More particularly, it is nearly impossible to insert optical fibers into and through furcation tubes that are at their theoretical minimum diameter. To overcome this challenge, furcation tubes are provided that are transformable from an expanded configuration to a contracted configuration upon the application of a stimulus. In this way, the optical fibers may be inserted into and through the furcation tubes when in the expanded position and thereafter transformed to the contracted position to be at or nearly at the theoretical minimum diameter. In one instance, the furcation tubes may be formed from heat shrink material and the transformation from the expanded configuration to the contracted configuration may be achieved by the application of heat. By providing a minimized cross-sectional width, a smaller pulling grip may be used to install the fiber optic cable assembly along pathways in a data center or other fiber optic network environment (which may have minimal space). If the furcation tubes are sufficiently small compared to the connection interfaces used to terminate the optical fibers, then the size of the pulling grip, e.g., such as the pulling grip's maximum inner diameter, may be solely determined by the size of the connection interface and any bypass furcation tubes may fit within the interstitial spaces between the connection interface and the pulling grip.

Figure 1:
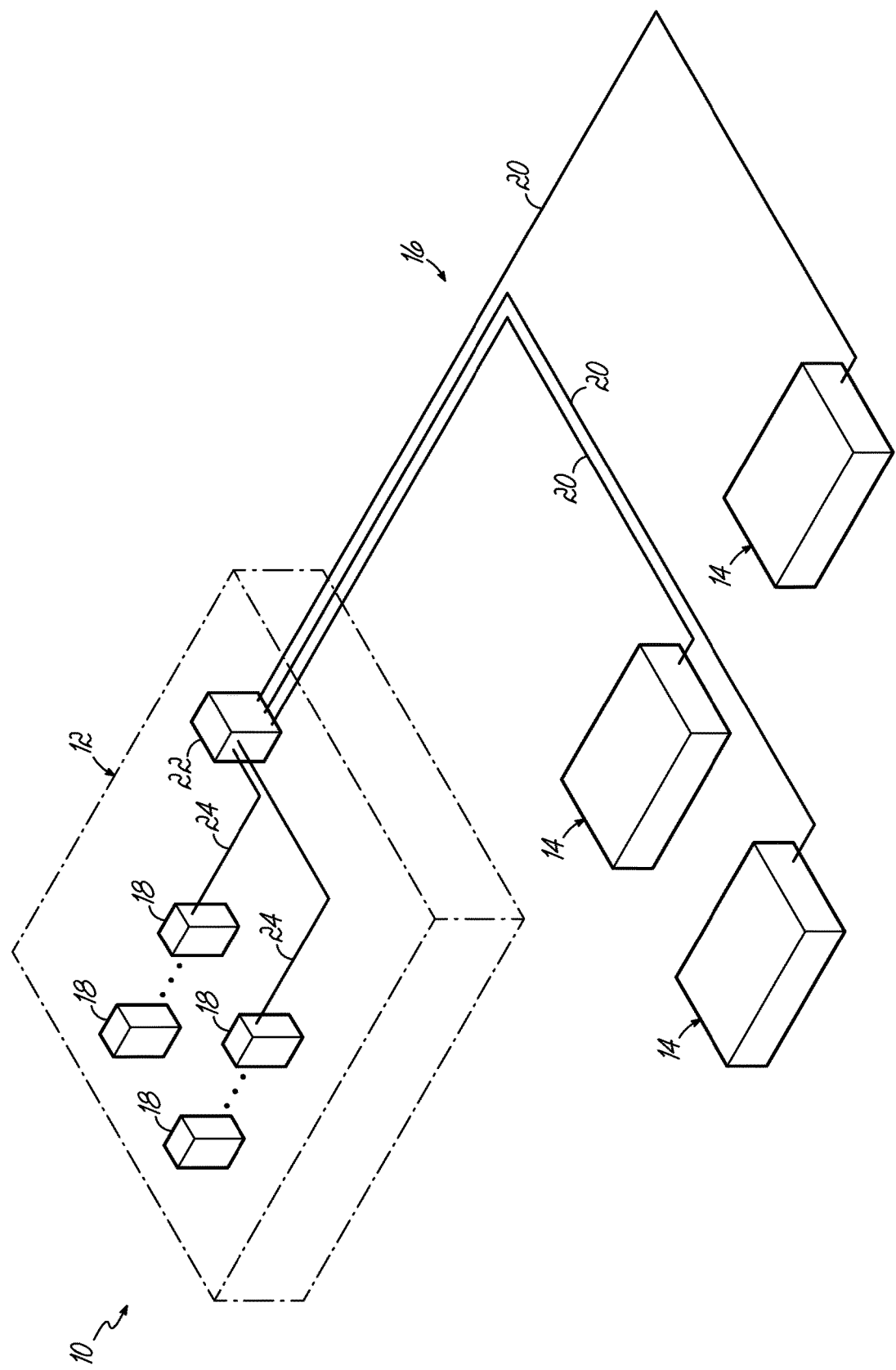
FIG. 1 is a schematic illustration of a data center campus according to an exemplary embodiment of the disclosure.

As illustrated in FIG. 1, a modern-day data center 10 may include a collection of buildings (referred to as a data center campus) having, for example, a main building 12 and one or more auxiliary buildings 14 in close proximity to the main building 12. While three auxiliary buildings are shown, there may be more or less depending on the size of the campus. The data center 10 provides for a local fiber optic network 16 that interconnects the auxiliary buildings 14 with the main building 12. The local fiber optic network 16 allows network equipment 18 in the main building 12 to communicate with various network equipment (not shown) in the auxiliary buildings 14. In the exemplary embodiment shown, the local fiber optic network 16 includes trunk cables 20 extending between the main building 12 and each of the auxiliary buildings 14. Conventional trunk cables 20 generally include a high fiber-count arrangement of optical fibers for passing data and other information through the local fiber optic network 16. In the example illustrated in FIG. 1, the trunk cables 20 from the auxiliary buildings 14 are routed to one or more distribution cabinets 22 housed in the main building 12 (one shown).

Within the main building 12, a plurality of indoor fiber optic cables 24 ("indoor cables 24") are routed between the network equipment 18 and the one or more distribution cabinets 22. The indoor cables 24 generally include a high fiber-count arrangement of optical fibers for passing data and other information from the distribution cabinets 22 to the network equipment 18. Although only the interior of the main building 12 is schematically shown in FIG. 1 and discussed above, each of the auxiliary buildings 14 may house similar equipment for similar purposes. Thus, although not shown, each of the trunk cables 20 may be routed to one or more distribution cabinets 22 in one of the auxiliary buildings 14 in a manner similar to that described above. Furthermore, each of the auxiliary buildings 14 may include indoor cables 24 that extend between network equipment 18 and the one or more distribution cabinets 22 of the auxiliary building 14.

As noted above, during original construction of a data center or during upgrades to existing data centers, to provide increased bandwidth, there is a desire to increase the number of optical fibers that extend along both the external and internal pathways of the data center. In upgrade scenarios, for example, the data center infrastructure is established and the challenge is how to fit more optical fibers within a fixed-size pathway (e.g., conduits, ducts, raceways, etc.). This challenge is exacerbated during installation, where a pulling grip that is typically larger than the fiber optic cable or cable assembly to which it is attached, is used to pull the fiber optic cable or cable assembly through the pathway. Aspects of the present disclosure are directed to fiber optic cable assemblies (e.g., pre-terminated fiber optic cables) that minimize the cross-dimensional profile or width of the cable assembly. By reducing the cross-dimensional width of the fiber optic cable assembly, difficulties and barriers associated with the installation of the fiber optic cable assembly in fixed-size pathways are eased.

Figure 2:
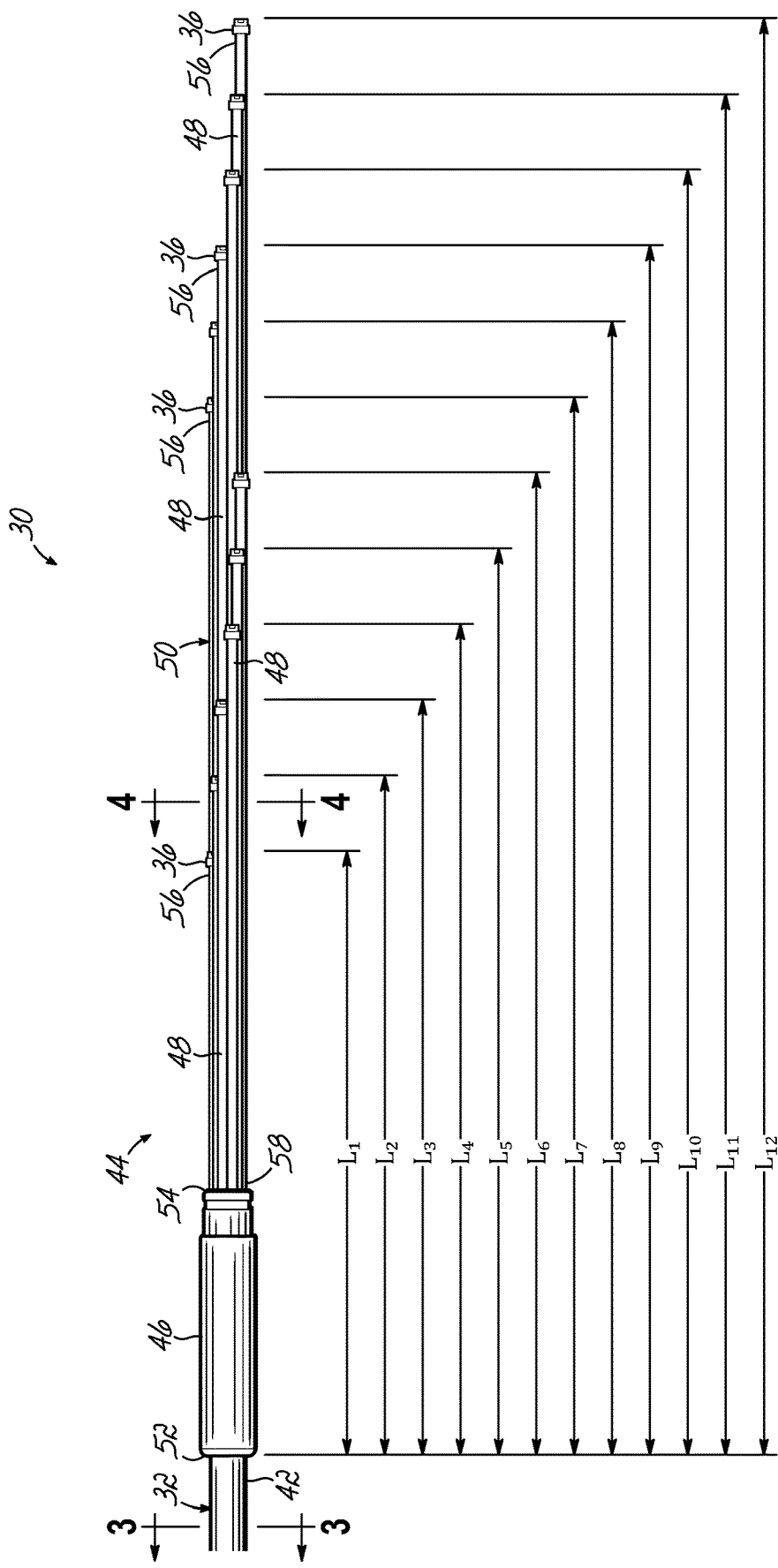
FIG. 2 is a partial top plan view of a fiber optic cable assembly in accordance with an embodiment of the disclosure.

FIG. 2 illustrates a fiber optic cable assembly 30 in accordance with an embodiment of the disclosure. In general, the fiber optic cable assembly 30 includes a fiber optic cable 32 carrying a plurality of optical fibers 34 (FIG. 3) for passing data and other information through the local fiber optic network 16 or other network, and a plurality of (pre-terminated) connection interfaces 36 that terminate end sections of the optical fibers 34 for connection to other fiber optic devices in the network. Only one end of the fiber optic cable assembly 30 is shown in FIG. 2 and more fully described below. It should be appreciated, however, that the other end of the fiber optic cable assembly 30 not shown may be constructed in a similar manner or in a different manner depending on the particular application for which the fiber optic cable assembly is being used.

Figure 3:
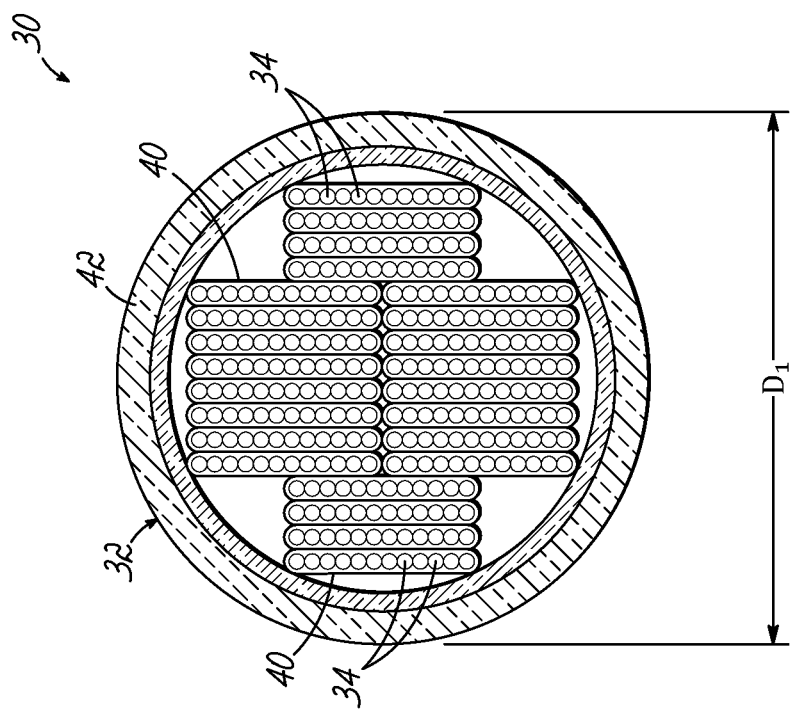
FIG. 3 is a cross-sectional view of the fiber optic cable shown in FIG. 2 generally taken along the line 3-3.

The number of optical fibers 34 carried by the fiber optic cable 32 and how the optical fibers 34 are arranged within the fiber optic cable 32 may vary based on the application. FIG. 3 illustrates an exemplary embodiment of the fiber optic cable 32 that provides for a compact arrangement of the optical fibers 34 to thereby minimize the cross-dimensional width $D_i$ of the fiber optic cable 32. The fiber optic cable 32 is configured to carry a pre-selected number of optical fibers 34. By way of example and without limitation, the fiber optic cable 32 may be configured to carry 96, 144, or 288 optical fibers 34. It should be recognized, however, that more or less optical fibers 34 may be carried by the fiber optic cable 32.

As discussed above, due to their compact arrangement of optical fibers, in one embodiment the optical fibers 34 in the fiber optic cable 32 may be configured as a plurality of fiber optic ribbons 40. As used in this disclosure, the terms "fiber optic ribbon(s)", "ribbon(s)", and "optical fiber ribbon(s)" may be used interchangeably to refer to a group of optical fibers (e.g., 4, 8, 12, or 16 optical fibers) that are configured to be arranged side-by-side in an array, with adjacent optical fibers being held together by a binding matrix or material (e.g., adhesive, tape, or the like). In a preferred embodiment, the plurality of fiber optic ribbons 40 in the fiber optic cable 32 may be rollable ribbon, where adjacent optical fibers 34 of the ribbon 40 are held together only intermittently along their length. This allows the ribbon 40 to be more easily rolled or otherwise shaped into something other than a linear or flat ribbon. It should be recognized, however, that in alternative embodiments, the optical fibers 34 may take the form of other types of ribbon (e.g., flat ribbon), other types of optical fiber groupings, or no groupings of the optical fibers 34. In any event, such ribbons, groupings, etc. are generally known in the art and thus will not be further described herein. The ribbons 40 of the fiber optic cable 32 may be arranged within a cable sheath 42 ("cable jacket 42"), which may be a thin layer of material that has been extruded over the ribbons 40. In the figures and description, the fiber optic cable 32 includes twenty-four ribbons 40 that each include twelve optic fibers 34 to result in a total of 288 optical fibers 34. It should be appreciated that this is merely exemplary and not intended to limit the scope of the disclosure, as the number of optical fibers 34 in each ribbon 40 and the number of ribbons 40 carried by the fiber optic cable 32 may vary.

The pre-termination of the optical fibers 34 of the ribbons 40 with connection interfaces 36 occurs at a furcation 44 in the fiber optic cable assembly 30, as is generally known in the fiber optic industry. The furcation 44 includes a furcation housing 46 and a plurality of furcation tubes 48 that at least partially define a plurality of furcation legs 50. The furcation housing 46 may be designed to interface with a pulling grip assembly (not shown), such as that described in U.S. Patent Application Publication No. 2022/0120988A1, the disclosure of which is fully incorporated herein by reference. At least one optical fiber 34, and preferably a grouping of optical fibers 34 (e.g., one, two, or three ribbons 40), extends through each of the furcation tubes 48 and is terminated with at least one connection interface 36 at the end of the furcation tubes 48. Thus, the furcation 44 generally corresponds to an end section of the fiber optic cable assembly 30.

To form the furcation 44, the cable jacket 42 may be severed at a first end of the fiber optic cable 32 to expose a working length of the ribbons 40. The furcation housing 46 may be disposed over the working length of the ribbons and a distal end 52 of the furcation housing 46 may then be connected to the severed end of the cable jacket 42. The ribbons 40 extend through the furcation housing 46. More specifically, end sections of the ribbons 40 extend beyond a proximal end 54 of the furcation housing 46. One or more of the ribbons 40 are then inserted through each of the furcation tubes 48 such that a portion of the working length of the ribbons 40 extends beyond a proximal end 56 of the furcation tubes 48. A distal end 58 of each of the furcation tubes 48 is then inserted into the proximal end 54 of the furcation housing 46. The furcation housing 46 is then filled with an adhesive (e.g., an epoxy adhesive) to secure the fiber optic cable 32 and the furcation tubes 48 to the furcation housing 46. In an exemplary embodiment, there may be twelve different furcation legs 50. Since there are twenty-four ribbons 40 in the fiber optic cable 32, each furcation tube 48 may respectively receive two of the ribbons 40. It should be recognized, however, that the number of furcation tubes 48 and the number of ribbons 40 per furcation tube 48 may vary.

The ribbons 40 that extend beyond the proximal end 56 of the furcation tubes 48 may then be terminated with a connection interface 36. More particularly, at each furcation tube 48, the one or more ribbons 40 extending therethrough may be terminated with at least one connection interface 36. As used herein, the term "connection interface" refers more broadly to an optical connector, optical connector subassembly, or one or more optical connector components (e.g., ferrules) that facilitate coupling of the optical fibers on which they are installed to other optical fibers that are terminated with a same or different connector interface. There does not need to be a connector housing (also referred to simply as a "housing", a "connector body", or simply "body") receiving the ferrule. It may just be the ferrule terminating the optical fibers, or just the ferrule and components other than a connector housing such that the connection interface itself remains something less than an optical connector. As is known in the industry, optical connectors are designed to provide two primary functions: alignment of optical fibers for optical coupling, and mechanical retention to maintain that alignment. A ferrule is typically the primary component for optical alignment purposes, and the connector housing is typically the primary component for retention purposes since it typically includes a coupling mechanism (e.g., a latch feature for cooperating with a complementary latching feature of an adapter). The connector housing defines at least one mechanical reference plane or datum for retention. A connection interface not having such a connector housing is considered an incomplete optical connector in this disclosure.

Any conventional, or yet to be developed, optical connector, connector component (e.g., ferrule) or connectorization scheme may be used in accordance with the present disclosure, including, but not limited to multi-fiber connectors or components (e.g., MPO connectors/components). For example, the connection interfaces 36 may include MPO (multi-fiber push on) connectors/components, which are configured for multi-fiber cables. In other embodiments, the connection interfaces 36 may be a different type of multi-fiber connector/components, such as an SN-MT connector/components commercially available from Senko Advanced Components, Inc. or an MMC connector/components commercially available from US Conec Ltd. In a preferred embodiment, the connection interfaces 36 may be configured as multifiber ferrules, such as MT ferrules. By way of example and without limitation, in one embodiment, each furcation leg 50 may include a single multifiber ferrule 36 that terminates the ends of the two twelve-fiber ribbons 40. Thus, the ferrules 36 may each be twenty-four-fiber ferrules 36. It should be recognized, however, that the number of connection interfaces 36 per furcation leg 50 and the number of optical fibers 36 per connection interface 36 may vary.

As discussed above, in an exemplary embodiment the connection interfaces 36 of the furcation 44 of the fiber optic cable assembly 30 may be pre-terminated to avoid field assembly of the optical interfaces 36 to the optical fibers 34 of the fiber optic cable 32. More particularly, as is generally known in the art, the fiber optic cable 32 may be pre-terminated at the first end (and at its other end, if desired) in a factory environment using high-precision automated processes to attach the connection interfaces 36 to the optical fibers 34 and thereby form the fiber optic cable assembly 30.

As illustrated in the figures, in one embodiment, the furcation 44 may have a staggered configuration where each furcation leg 50 has a different respective length $L_1$, $L_2$, ... $L_{12}$ (e.g., monotonically increasing) as measured from the severed end of the cable jacket 42 to the end of the at least one connection interface 36 corresponding to that furcation leg 50. In an exemplary embodiment, the furcation tubes 48 associated with the respective furcation legs 50 may extend to the at least one connection interface 36. In an alternative embodiment, however, there may be a short portion of the working length of the ribbons 40 exposed between the proximal end 56 of the furcation tubes 48 and the at least one connection interface 36 associated with the respective furcation legs 50. There may also be some portion of the working length of the ribbons 40 not covered by the furcation tubes 48 within the furcation housing 46. In any event, it should be appreciated that the furcation tubes 48 may extend along the vast majority of the overall length of their respective furcation legs 50. For example, the furcation tubes 48 may extend along at least 80%, at least 90%, or even at least 95% of the length of their respective furcation legs 48 in some embodiments.

Figure 4:
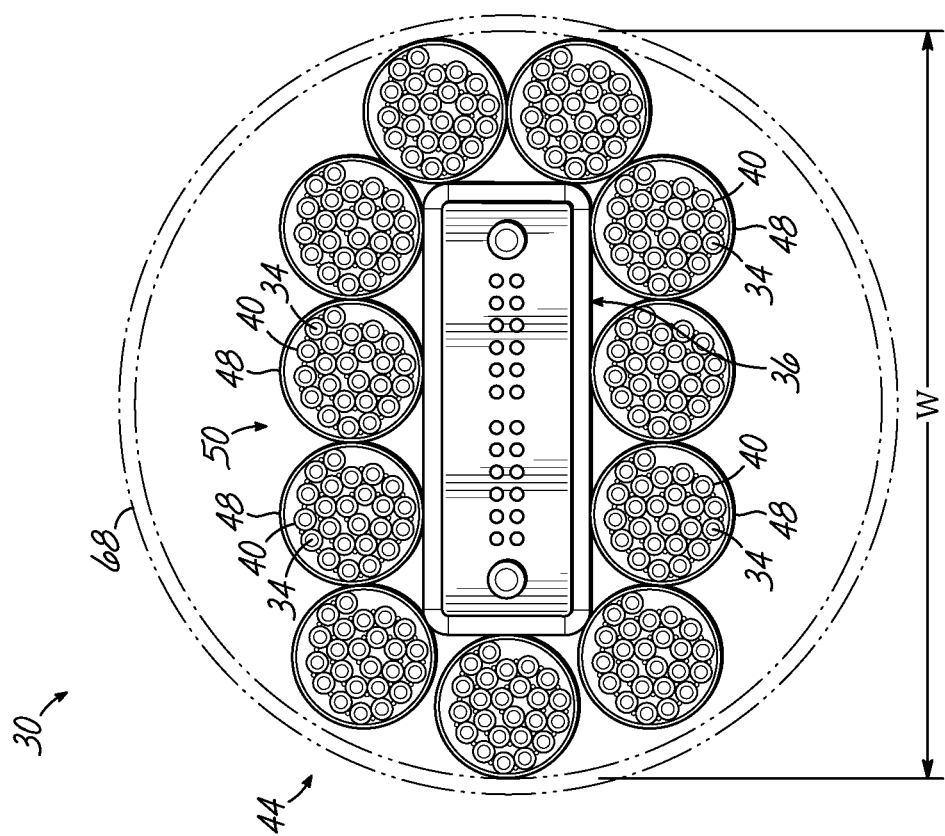
FIG. 4 is a cross-sectional view of the fiber optic cable assembly shown in FIG. 2 taken along the connection interface associated with the shortest furcation leg.

With such a staggered configuration of the furcation 44 of the fiber optic cable assembly 30, a cross-section of the fiber optic cable assembly 30 taken at the at least one connection interface 36 associated with the furcation legs 50 (but for perhaps the at least one connection interface 36 associated with the longest furcation leg 50 having the length $L_{12}$) includes the at least one connection interface 36 associated with the selected furcation leg 50 and one or more bypass furcation tubes 48 that extend past and beyond the at least one connection interface 36. In the exemplary embodiment illustrated in the figures, each furcation leg 50 (and there are twelve in total) includes a single connection interface 36 (e.g., multifiber ferrule). Thus, a cross-section of the fiber optic cable assembly 30 taken at the connection interface 36 of the first and shortest length $L_1$ furcation leg 50 includes a connection interface 36 and eleven bypass furcation tubes 48. FIG. 4 illustrates the cross-section of the fiber optic cable assembly 30 at this location. A cross-section of the fiber optic cable 30 taken at the connection interface 36 of the second and next shortest length $L_2$ furcation leg 50 includes a connection interface 36 and ten bypass furcation tubes 48. This pattern (a connection interface 36 and a reduced number of bypass furcation tubes 48) continues until a cross-section at the connection interface 36 of the twelfth and longest length $L_{12}$ furcation leg 50 includes only a connection interface 36 (i.e., no bypass furcation tubes 48; see FIG. 2).

As discussed above, the maximum cross-dimensional width W of the fiber optic cable assembly 30 typically does not occur along the fiber optic cable 32, due in part to the efficient organization of the optical fibers 34 in ribbons 40. Instead, the maximum cross-dimensional width W of the fiber optic cable assembly 30 typically occurs along the furcation 44. Oftentimes the primary challenge to keeping the cross-sectional width W within a desired constraint is not the furcation housing 46, but rather the remaining portion of the furcation 44, where the cross-dimensional width must accommodate not only the connection interfaces 36 but also the bypass furcation tubes 48. Thus, the maximum cross-dimensional width W of the fiber optic cable assembly 30 often occurs at the at least one connection interface 36 associated with one of the furcation legs 50. In the exemplary embodiment, for example, each furcation leg 50 includes the same type and number of connection interfaces 36 (e.g., one connection interface 36 per furcation leg 50). Accordingly, the maximum cross-dimensional width W is likely to occur at the at least one connection interface 36 associated with the furcation leg 50 that has the most bypass furcation tubes 48. In the instant case, the maximum cross-dimensional width W of the fiber optic cable assembly 30 occurs at the connection interface 36 associated with the first furcation leg 50 having the shortest length $L_1$, since a cross-section at that location includes eleven bypass furcation tubes 48 (the maximum number along the furcation 44).

As discussed above, there is a desire to reduce the maximum cross-dimensional width W of the fiber optic cable assembly 30 to facilitate installation of the cable assembly 30 along internal or external pathways with limited space. A pulling grip 68 (shown in phantom in FIG. 4) is used to install the cable assembly 30 along the pathways and attaches to the furcation housing 46 so as to encapsulate the remainder of the furcation 44. Thus, the pulling grip 68 generally defines the largest cross-dimensional width of the fiber optic cable assembly 30 during installation. However, the size of the pulling grip 68 (e.g., constrained by its maximum inner diameter) is determined by the maximum cross-dimensional width W of the fiber optic cable assembly 30 to which it is attached. Thus, to reduce the size of the pulling grip 68, one approach may focus on reducing the maximum cross-dimensional width W of the underlying fiber optic cable assembly 30. In some embodiments according to this disclosure, the maximum inner diameter of the pulling grip 68 is less than the outer diameter of the furcation housing 46, and is limited by the maximum cross-dimensional width W of the remaining portion of the furcation 44.

As can be appreciated from FIG. 4, there are generally two contributors to the maximum cross-dimensional width W of the fiber optic cable assembly 30 in the portion of the furcation 44 that extends from the furcation housing 46: i) the size of the at least one connection interface 36; and ii) the size of the bypass furcation tubes 48. While there has been and continues to be significant effort in developing new optical connectors, ferrules, and connector components that have a reduced size, there has been relatively little effort in reducing the size of the furcation tubes 48 used in the furcation 44. The present disclosure focuses on reducing the maximum cross-dimensional width W of the fiber optic cable assembly 30 in the portion of the furcation 44 that extends from the furcation housing 46 by reducing the size (e.g., the diameter) of the furcation tubes 48.

The size of current furcation tubes is not optimized (i.e., minimized) but is selected to allow the desired number of optical fibers, such as a desired number of ribbons, to be inserted through the furcation tubes with relative ease. Accordingly, current furcation tubes are typically oversized from what is needed to contain the optical fibers. Conceptually, the size of the furcation tube depends at least in part on: i) the size of the individual optical fibers; ii) the number of optical fibers extending through the furcation tube; and iii) the packing density of the optical fibers within the furcation tube. Current fiber optic cables use optical fibers of various nominal diameters. As used in this disclosure, the term "nominal diameter" refers to a stated or intended diameter and includes variations due to manufacturing tolerances. The term "size" is used interchangeably with "nominal diameter" in relation to optical fibers. For example, three available sizes (nominal diameters) of optical fibers include 150 micrometers (µm), 200 µm, and 250 µm. Moreover, the number of optical fibers extending within the furcation tube may depend on the architecture of the fiber optic cable assembly, including the type of connection interfaces that terminate the optical fibers at the end of the furcation tube. For example, current furcation tubes may be configured to include 8, 12, 16, or 24 optical fibers extending through the furcation tubes.

In many cases, it is the third factor, i.e., the packing density, that limits manufacturers' ability to reduce the size of the furcation tubes. If the packing density is relatively low, then the optical fibers may be easily inserted into and through the furcation tubes. However, as the packing density increases (i.e., reducing the cross-sectional area of the furcation tube for a given number of optical fibers), it becomes increasingly difficult to insert the optical fibers into and through the furcation tube. The insertion into a furcation tube becomes more difficult due to the challenges of aligning the optical fibers with an opening on the end of the furcation tube, and the risk of the optical fibers jamming against the end of the furcation tube and becoming damaged increases. The insertion through a furcation tube becomes more difficult due to the friction the optical fibers make with each other and with the inner wall of the furcation tube along its length. As can be appreciated, there is a practical limit to the packing density that will allow the optical fibers to be inserted into and through the length of the furcation tube. As noted above, current furcation tubes are sized so as not to approach this practical limit and thereby allow the optical fibers to be inserted into and through the furcation tubes with relative ease.

Aspects of the present disclosure are directed to ways to increase the packing density beyond this practical limit. Overcoming this practical limit will, in turn, allow smaller furcation tubes to contain a given number of optical fibers of a certain size. More particularly, according to aspects of the present disclosure, the packing density is configured to approach a theoretical limit (a maximum density), and thus the size of the furcation tube that will contain a given number of optical fibers of a certain size will approach its theoretical limit (a minimum size). In other words, given a certain number of optical fibers (e.g., twenty-four optical fibers) of a specified size (e.g., 200 µm), there is a theoretical minimum in the diameter of a circle (i.e., the inner diameter of the furcation tube) that will contain those optical fibers. The goal is to drive the diameter of the furcation tubes to that theoretical minimum but still allow the furcation to be manufactured.

Figure 5:
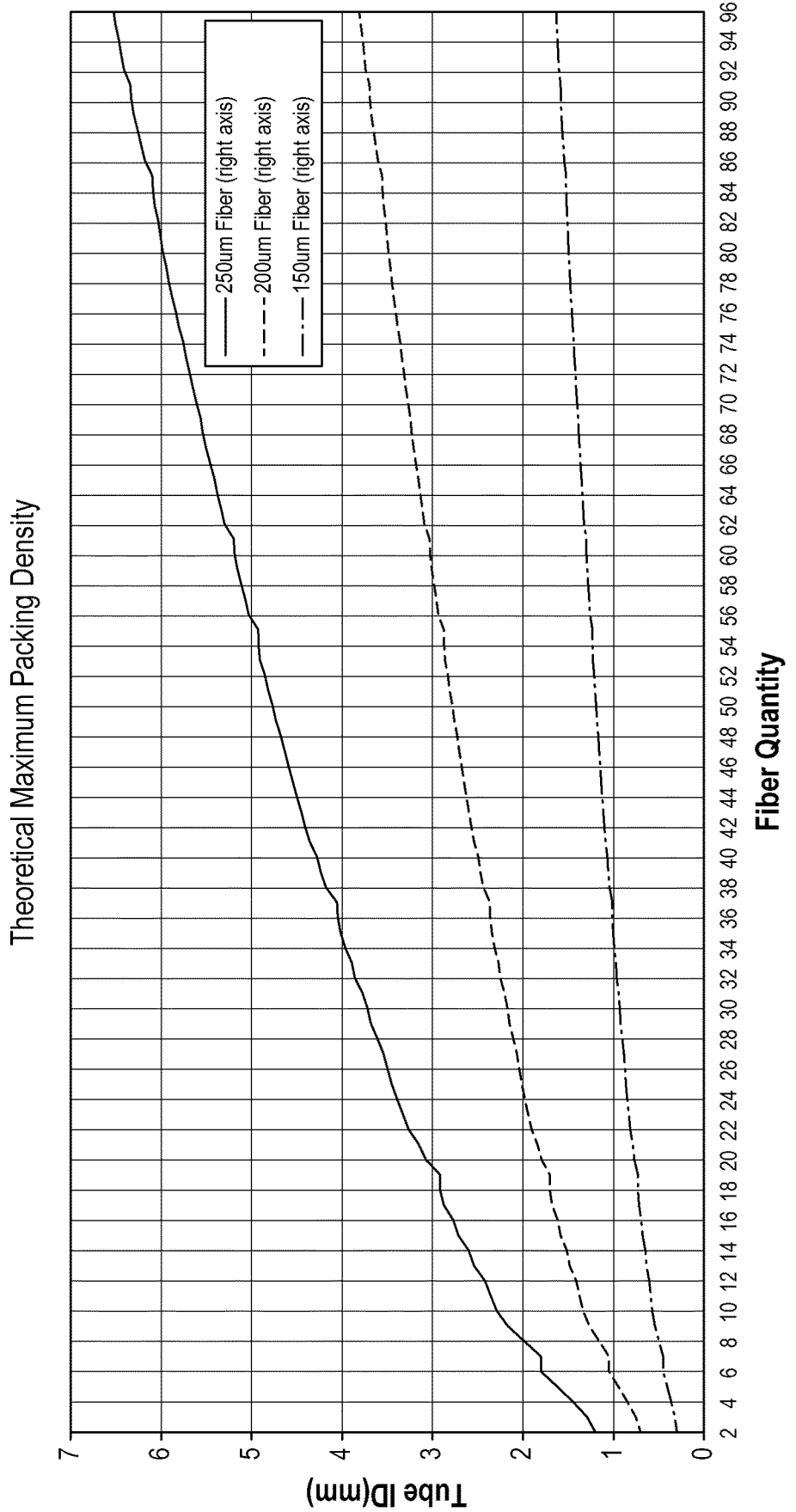
FIG. 5 is a graphical illustration showing the theoretical minimum diameter of a tube containing a quantity of optical fibers of a specific size.

Information on the theoretical limit in packing density may be found in the academic literature. By way of example, the URL http://hydra.nat.uni-magdeburg.de/packing/cci/cci.html #Download provides information on the best packing density for equal circles in a circle (having a unit radius). Based on this (downloadable) information, the inventors were able to determine the theoretical minimum inner diameter of a furcation tube that contains a given number of optical fibers of a specific size. FIG. 5, for example, illustrates a plot of a furcation tube's theoretical minimum inner diameter (in millimeters on the y axis) as a function of the number of optical fibers (on the x axis) for three different optical fiber sizes: 150 µm (dash-dot curve), 200 µm (dash curve), and 250 µm (solid curve). FIG. 6 illustrates a table that provides the theoretical minimum inner diameter of a furcation tube for some common numbers and sizes of optical fibers.

The theoretical minimum in the inner diameter of a furcation tube as provided above is based on the assumption that the optical fibers extending therethrough are "loose" optical fibers, i.e., each optical fiber is not connected to an adjacent optical fiber and thus is free to position itself as needed to reach to optimal packing configuration. As noted above, however, in many cases, the optical fibers are not loose but instead are formed as ribbons (such as ribbons 40). Rollable ribbons, due to their intermittent connections between adjacent optical fibers, allow the optical fibers to move in much the same way as loose optical fibers. Accordingly, it is believed that the packing density for rollable ribbons that extend through a furcation tube is substantially the same as that for loose optical fibers and therefore the theoretical minimum in the furcation inner diameter is believed to be attainable with rollable ribbon.

In accordance with an aspect of the disclosure, the inner diameter $D_i$ of the furcation tubes 48 in the fiber optic cable assembly 30 are at or as close as possible to their theoretical minimum value in accordance with that above (see FIG. 5). As used herein, the term "substantially at the theoretical minimum diameter" means at or within 5% and preferably within 3% of the theoretical minimum diameter. As noted above, this may contribute to a reduction in the maximum cross-sectional width W of the fiber optic cable assembly 30. However, it should be recognized that a challenge remains in how to attain this reduction in the size of the furcation tubes 48 in a manner that can actually be produced. Recall that in current manufacturing processes, the ability to insert the ribbons 40 in the furcation tubes 48 is what limits the reduction in size of the furcation tubes 48.

Figure 7:
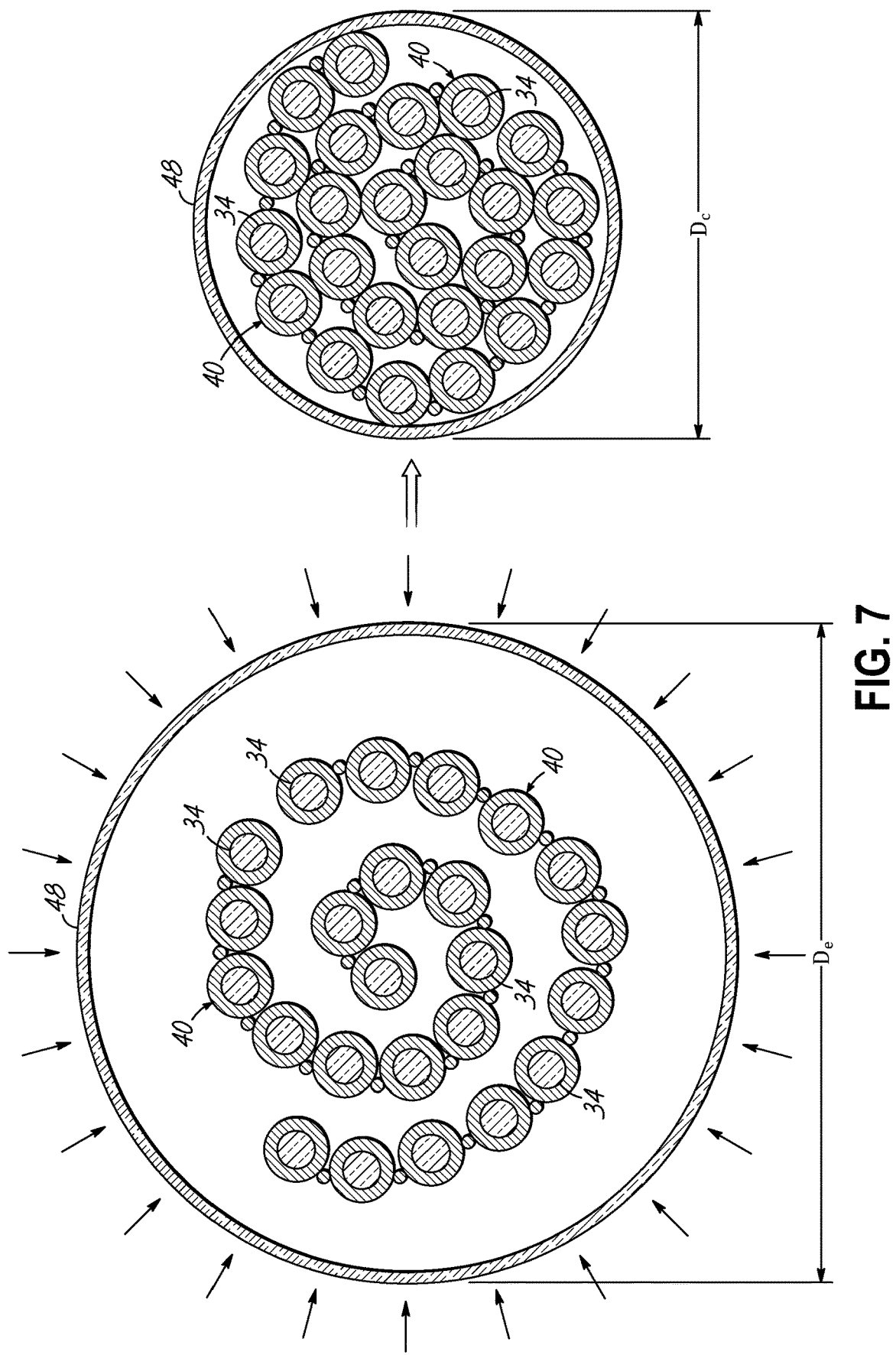
FIG. 7 is a schematic illustration of a transformable furcation tube from an expanded configuration to a contracted configuration.

In accordance with a further aspect of the disclosure, and as schematically illustrated in FIG. 7, the furcation tubes 48 do not have a static size, as is the case in current cable assemblies and manufacturing processes, but instead are configured to be contractable. More particularly, the furcation tubes 48 are configured to have a first expanded configuration, a second contracted configuration, and the ability to transform from the expanded configuration to the contracted configuration upon the application of an external stimulus. In the expanded configuration (left side of FIG. 7), the furcation tube 48 has a relatively large diameter $D_e$ that is sufficiently large to allow the one or more ribbons 40 (and the optical fibers 34 carried thereby) to be inserted through the furcation tube 48 relatively easily. In the contracted configuration (right side of FIG. 7), the furcation tube 48 has a contracted diameter $D_c$ as compared to the expanded diameter $D_e$.

In one embodiment, the contracted diameter $D_c$ of the furcation tube 48 may be selected to be substantially at the theoretical minimum diameter $D_t$ or greater than but as close as possible to the theoretical minimum diameter $D_t$ given the size of the optical fibers 34 (e.g., 150, 200, or 250 µm), the number of optical fibers 34 (e.g., 24, 72, 96 optical fibers), and the configuration of the optical fibers 34 (e.g., loose fibers, rolled ribbon, flat ribbon, etc.). In an alternative embodiment, the contracted diameter $D_c$ of the furcation tube 48 may be selected to be less than the theoretical minimum diameter $D_t$. For example, the contracted diameter $D_c$ may be selected to be between about 3% to about 10%, and preferably about 5% less than the theoretical minimum diameter $D_t$. It should be understood that while the furcation tube 48 may be selected to have a contracted diameter $D_c$ that is less than the theoretical minimum diameter $D_t$, in reality the furcation tube 48 will not contract to below the theoretical minimum diameter $D_t$. This selection just ensures, allowing for some amount of error, that the furcation tube 48 will be at or as close as possible to the theoretical minimum diameter $D_t$. For some groupings of optical fibers there should be no issues with using a furcation tube having a contracted diameter $D_c$ slightly less than the theoretical minimum diameter $D_t$. However, for other groupings of optical fibers care must be taken in selecting the amount of contraction of the furcation tube 48 so as not to apply too much pressure to the optical fibers and cause damage (e.g., microbends).

In an exemplary embodiment, the furcation tubes 48 may be formed from a heat shrink material and transformable from the expanded configuration to the contracted configuration through the application of heat. By way of example and without limitation, the furcation tubes 48 may be formed from various polyolefin, fluoropolymer, or fluoroelastomer materials. In one embodiment, for example, the furcation tubes 48 may be formed from FE P (fluorinated ethylene propylene). Moreover, the furcation tubes 48 may be configured to have a shrink ratio between about 20% and about 50%, and preferably between about 25% and about 35%. As used herein, the term "shrink ratio" refers to the ratio of the furcation tube's inner diameter in the expanded configuration (expanded diameter $D_e$) to the furcation tube's inner diameter in the fully contracted configuration (contracted diameter $D_c$). Other shrink ratios, however, may be possible.

During the manufacturing of the furcation 44 as described above, once the ribbons 40 have been inserted through the respective furcation tubes 48 while in the expanded configuration, heat may be applied to the furcation tubes 48 to drive the size of the furcation tubes 48 toward the theoretical minimum diameter $D_t$. By using contractable materials for the furcation tubes 48, the furcation tubes 48 may be as small as possible given the construct of the fiber optic cable assembly. Moreover, because the furcation tubes 48 may contribute to the maximum cross-dimensional width W of the fiber optic cable assembly 30, minimizing the size of the furcation tubes 48 may similarly reduce the maximum cross-dimensional width W characterizing the fiber optic cable assembly 30.

Depending on the relative sizes of the connection interfaces 36 and the furcation tubes 48, and the number of bypass furcation tubes 48 at the likely location of the maximum cross-dimensional width W of the fiber optic cable assembly 30 (e.g., at the connection interface 36 associated with the shortest furcation leg 50 of length $L_1$), it may be possible that the size of the pulling grip 68 may be dictated solely by the connection interface 36. The connection interface 36 can be considered to have a certain "footprint", which in this disclosure refers to a rectangular area in a cross-sectional plane that is transverse to a longitudinal axis of the connection interface 36. Additionally, the longitudinal axis of the connection interface 36 is generally aligned with (i.e. coaxial with or parallel to) the longitudinal axis along which the fiber optic cable extends for the purpose of this disclosure. The footprint is the maximum circumscribed rectangular area that includes the connection interface 36.

Figure 8:
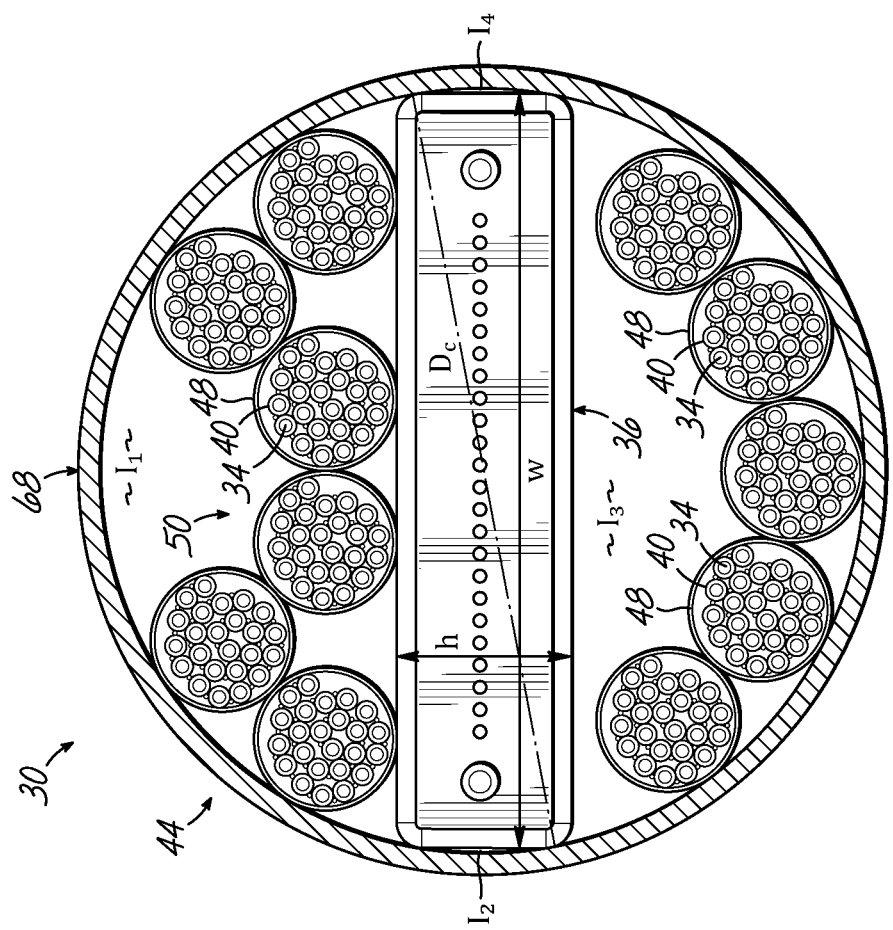
FIG. 8 illustrates a pulling grip over a furcation of a fiber optic cable assembly, where the size of the pulling grip is determined by the size of the connection interface.

By way of example, FIG. 8 illustrates the scenario referred to above. In this embodiment, the footprint of the connection interface 36 is shown as having a height h and a width w. The pulling grip 68, which generally has a circular cross-sectional shape, is selected so as to circumscribe the rectangular connection interface 36. Based on trigonometry, the inner diameter $D_i$ of the pulling grip 68 may be determined as a function of the size of the connection interface 36 and is given by:

$$D_i = \sqrt{h^2 + w^2} \qquad (1)$$

In this configuration, the space not occupied by the connection interface 36 is referred to as the interstitial space I and represents the available space for the bypass furcation tubes 48. As noted in FIG. 8, there may be four interstitial spaces $I_1, I_2, I_3,$ and $I_4$ potentially available for receiving the bypass furcation tubes 48.

As noted above, the relative size difference between the connection interface 36 and the furcation tubes 48 may make it possible to fit all the bypass furcation tubes 48 (especially if their size has been minimized as described above) in the interstitial spaces I between the connection interface 36 and the pulling grip 68. For example, FIG. 8 illustrates six furcation tubes 48 in one of the upper or lower interstitial spaces $I_1, I_3$ relative to the connection interface 36 and five furcation tubes 48 in the other of the upper or lower interstitial spaces $I_1, I_3$ relative to the connection interface 36. In this embodiment, there are no furcation tubes 48 on the lateral interstitial spaces $I_2, I_4$ relative to the connection interface 36. The illustration in FIG. 8 is exemplary and it should be recognized that there may be a wide range of combinations in connector interface sizes, furcation tube sizes, and number of bypass furcation tubes such that the bypass furcation tubes 48 fit within the interstitial spaces I between the connection interface 36 and the inside of the pulling grip 68. Thus, aspects of the disclosure are not limited to that shown in FIG. 8. In any event, when such a scenario occurs, the maximum size of the pulling grip 68 may be related to the size of the connection interface 36 through equation (1) above.

As discussed above, during installation of the fiber optic cable assembly 30, the pulling grip 68 represents the maximum cross-dimensional width of the fiber optic cable assembly 30, since the pulling grip 68 accommodates the maximum cross-dimensional width of the underlying cable assembly 30. To reduce the size of the pulling grip 68, the maximum cross-dimensional width of the underlying fiber optic cable assembly 30 must be reduced. In the present disclosure, this is achieved by minimizing the size of the furcation tubes 48 used in the furcation 44 for terminating the fiber optic cable 32 with connection interfaces 36. More particularly, the diameter of the furcation tubes 48 in accordance with the disclosure is at or as close as possible to the theoretical minimum diameter $D_t$ for a given number and size of the optical fibers 34 extending through the furcation tubes 48. To overcome the practical limit associated with using small furcation tubes yet being able to insert the optical fibers into and along the length of the furcation tubes 48, the furcation tubes 48 are configured to be contractable or shrinkable upon the application of a suitable stimulus, such as heat. Thus, the optical fibers 34 may be inserted through the furcation tubes 48 when the furcation tubes 48 are in their expanded configuration, and once inserted, the furcation tubes 48 may be transformed to their contracted configuration at or near the theoretical minimum diameter $D_t$. Under certain conditions related to the size of the connection interface 36, the minimized size of the furcation tubes 48, and the number of bypass furcation tubes 48 in the particular construct of the fiber optic cable assembly 30, the maximum size of the pulling grip 68 may be determined solely by the size of the connection interface 36 and have a relationship between the two dictated by equation (1) above.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope of the disclosure.

What is claimed is:

1. A fiber optic cable assembly, comprising:
   a fiber optic cable having a first end and a second end and carrying a plurality of optical fibers, wherein each optical fiber of the plurality of optical fibers has a nominal outer diameter; and
   a furcation at one or both of the first end and the second end of the fiber optic cable, the furcation comprising:
      a furcation housing connected to the fiber optic cable and receiving the plurality of optical fibers therein; and
      a plurality of furcation tubes extending from the furcation housing, each of the plurality of furcation tubes receiving a number of the plurality of optical fibers of the fiber optic cable, and each of the plurality of furcation tubes defining at least in part a respective furcation leg of the furcation; and
      at least one connection interface terminating the number of the plurality of optical fibers received in each of the plurality of furcation tubes; and
   a pulling grip disposed over the furcation legs and attached to the furcation housing,
   wherein a maximum inner diameter of the pulling grip is less than an outer diameter of the furcation housing, and
   wherein at least one of the plurality of furcation tubes has a diameter substantially equal to a theoretical minimum diameter corresponding to the number and the nominal diameter of the optical fibers received in the at least one of the plurality of furcation tubes.

2. The fiber optic cable assembly of claim 1, wherein the plurality of optical fibers includes a plurality of fiber optic ribbons, and wherein each of the plurality of furcation tubes receives one or more of the fiber optic ribbons.

3. The fiber optic cable assembly of claim 2, wherein the plurality of fiber optic ribbons includes a plurality of rollable fiber optic ribbons.

4. The fiber optic cable assembly of claim 1, wherein the furcation has a staggered configuration where each furcation leg has a different length.

5. The fiber optic cable assembly of claim 1, wherein the fiber optic cable assembly has a maximum cross-dimensional width, and wherein the maximum cross-dimensional width occurs at the at least one connection interface associated with one of the furcation legs.

6. The fiber optic cable assembly of claim 5, wherein the furcation legs defined by the plurality of furcation tubes have different lengths, and wherein the maximum cross-dimensional width of the cable assembly occurs at the at least one connection interface associated with the furcation leg that has a shortest length.

7. The fiber optic cable assembly of claim 1, wherein the at least one of the plurality of furcation tubes is transformable from an expanded configuration having an expanded diameter to a contracted configuration having a contracted diameter less than the expanded diameter.

8. The fiber optic cable assembly of claim 7, wherein the at least one of the plurality of furcation tubes is formed from a heat shrink material.

9. The fiber optic cable assembly of claim 8, wherein the heat shrink material has a shrink ratio of between about 20% and about 50%.

10. The fiber optic cable assembly of claim 8, wherein the heat shrink material has a shrink ratio of between about 25% and about 35%.

11. The fiber optic cable assembly of claim 1, wherein the at least one connection interface has a footprint with a height h and a width w, and wherein the maximum inner diameter $D_i$ of the pulling grip is related to the at least one connection interface by $D_i = \sqrt{h^2 + w^2}$.

12. The fiber optic cable assembly of claim 1, wherein relative sizes of the plurality of furcation tubes and the at least one connection interface are configured such that the maximum inner diameter of the pulling grip is determined solely by the size of the at least one connection interface.

13. A fiber optic cable assembly, comprising:
   a fiber optic cable having a first end and a second end and carrying a plurality of optical fibers; and
   a furcation at one or both of the first end and the second end of the fiber optic cable, the furcation comprising:
      a furcation housing connected to the fiber optic cable and receiving the plurality of optical fibers therein; and
      a plurality of furcation tubes extending from the furcation housing, each of the plurality of furcation tubes receiving a number of the plurality of optical fibers of the fiber optic cable, and each of the plurality of furcation tubes defining at least in part a respective furcation leg of the furcation; and
      at least one connection interface terminating the number of the plurality of optical fibers received in each of the plurality of furcation tubes; and
   a pulling grip disposed over the furcation legs and attached to the furcation housing,
   wherein a maximum inner diameter of the pulling grip is less than an outer diameter of the furcation housing, and
   wherein at least one of the plurality of furcation tubes is transformable from an expanded configuration having an expanded diameter to a contracted configuration having a contracted diameter less than the expanded diameter.

14. A method of making a fiber optic cable assembly from a fiber optic cable having a first end and a second end and carrying optical fibers, comprising:
   forming a furcation at one or both of the first end and the second end of the fiber optic cable, wherein the forming comprises:
      exposing a working length of the optical fibers;
      locating a furcation housing over a portion of the working length of the optical fibers so that end sections of the optical fibers extend through the furcation housing;

providing a plurality of furcation tubes, wherein at least one of the plurality of furcation tubes is a transformable furcation tube configured to transform from an expanded configuration having an expanded diameter to a contracted configuration having a contracted diameter less than the expanded diameter;

for each furcation tube of the plurality of furcation tubes, inserting a number of the optical fibers through the furcation tube; and terminating the number of the optical fibers extending through each furcation tube of the plurality of furcation tubes with at least one connection interface, wherein for each transformable furcation tube, the method further comprises:

after inserting the number of the optical fibers through the furcation tube, transforming the furcation tube from the expanded configuration toward the contracted configuration; and disposing a pulling grip over the end sections of the optical fibers and attaching the pulling grip to the fiber optic cable assembly, wherein a maximum inner diameter $D_i$ of the of pulling grip is less than an outer diameter of the furcation housing.

15. The method of claim 14, wherein:

each of the optical fibers has a nominal outer diameter; and for each transformable furcation tube, after transforming the furcation tube from the expanded configuration toward the contracted configuration, the furcation tube has a diameter substantially equal to a theoretical minimum diameter corresponding to the number and the nominal diameter of the optical fibers received in the furcation tube.

16. The method of claim 15, further comprising selecting each transformable furcation tube based on each transformable furcation tube being capable of having a contracted diameter less than the theoretical minimum diameter if the transformable furcation tube were transformed without the optical fibers being within the transformable furcation tube.

17. The fiber optic cable assembly of claim 14, wherein the at least one of the plurality of furcation tubes is formed from a heat shrink material, and wherein the heat shrink material has a shrink ratio of between about 25% and about 35%.

18. The method of claim 14, wherein each transformable furcation tube is formed from a heat shrink material, and wherein transforming the furcation tube from the expanded configuration toward the contracted configuration further comprises heating the at least one of the furcation tubes.

19. The method of claim 18, further comprising selecting each transformable furcation tube to have a heat shrink ratio between about 20% and about 50%.

20. The method of claim 18, further comprising selecting each transformable furcation tube to have a heat shrink ratio between about 25% to about 35%.

* * * * *